United States Patent [19]

Freeburg

[11] Patent Number: 5,327,572
[45] Date of Patent: Jul. 5, 1994

[54] NETWORKED SATELLITE AND TERRESTRIAL CELLULAR RADIOTELEPHONE SYSTEMS

[75] Inventor: Thomas A. Freeburg, Arlington Heights, Ill.

[73] Assignee: Motorola, Inc., Schaumburg, Ill.

[21] Appl. No.: 488,912

[22] Filed: Mar. 6, 1990

[51] Int. Cl.⁵ ............................................. H04B 7/19
[52] U.S. Cl. ................................. 455/13.1; 455/13.2; 455/33.1; 455/63; 379/60
[58] Field of Search .................... 455/12–13, 455/33–34, 63, 69–70, 127, 232, 234; 379/58–60, 63; 342/356

[56] References Cited

U.S. PATENT DOCUMENTS

| | | | |
|---|---|---|---|
| 4,523,155 | 6/1985 | Walczak | 330/279 |
| 4,613,990 | 9/1986 | Halpern | 455/33 |
| 4,731,866 | 3/1988 | Muratani et al. | 455/12 |
| 4,943,808 | 7/1990 | Dulck et al. | 455/12.1 |
| 5,008,952 | 4/1991 | Davis et al. | 455/12 |

OTHER PUBLICATIONS

Kachmar, Michael; "Land–Mobile Satellite Pick-Up Where Cellular Radio Leaves Off"; *Microwaves and RF*; Aug. 1984; pp. 33–35.
Dondl, Peter: "Digital Network Oriented Mobile Radio Satellite System as an Integrated Part of the GSM Cellular Radio System".
Rafferty, et al: "RF Developement for Mobile–Satellite Systems"; MSN & CT, Nov. 1988, pp. 28–30 and 37.
Del Re, Enrico: "An Integrated Satellite-Cellular Land Mobile System for Europe".
Binder, et al: "Crosslink Archetectures for a Multiple Satellite System"; IEEE, Jan. 1987, pp. 74–81.

*Primary Examiner*—Reinhard J. Eisenzopf
*Assistant Examiner*—Andrew Faile
*Attorney, Agent, or Firm*—Raymond J. Warren

[57] ABSTRACT

There is provided a mechanism for networking satellite and terrestrial networks. It comprises: maintaining subscriber-received power levels of terrestrial network transmissions about one order of magnitude above co-channel satellite transmissions to overcome interference and maintaining subscriber transmissions to terrestrial networks at power levels about one order of magnitude of the below co-channel transmissions to satellite networks to avoid causing interference at the satellite. Such power level maintenance is provided by the network in communication with such subscriber. Moreover, a non-orbiting ("grounded") satellite cooperates as a switching node of both the satellite network and a terrestrial network to relay information between a terrestrial subscriber and the satellite radiotelephone network over a terrestrial network. The terrestrial network and the satellite network may communicate via either the inter-satellite spectrum or the terrestrial-to-satellite spectrum.

16 Claims, 2 Drawing Sheets

NETWORKED SATELLITE AND TERRESTRIAL CELLULAR RADIOTELEPHONE SYSTEMS

THE FIELD OF INVENTION

This invention is concerned with satellite radiotelephone communications.

More particularly, this invention is concerned with networking satellite cellular radiotelephone networks with terrestrial radiotelephone networks.

BACKGROUND OF THE INVENTION

As illustrated in FIG. 1, one can envision a satellite-based cellular radiotelephone infrastructure as consisting of a constellation of satellites in a low Earth, polar orbit, each satellite having a number of satellite-to-ground frequencies that illuminate hundreds to thousands of square miles of global surface area. Each frequency (F3, for example) could be reused (both from the very same satellite 102 as well as by neighboring satellites 101), provided sufficient geographic separation is maintained to avoid causing interference among radio-telephone subscribers (168) on the ground. A subscriber (168) is handed off from frequency F3 to frequency F1 and from satellite (102) to satellite (101) as the constellation moves overhead. Using switch exchanges aboard the satellite, the satellites route calls among themselves over high speed, high bandwidth inter-satellite links (160, 161, 162) in order to globally connect conversants on the ground (168 and 170). A more complete presentation of such a satellite cellular system is given in U.S. patent application Ser. No. 263,849 to Bertiger, Satellite Cellular Telephone and Data Communication System, filed 28 Oct. 1988 assigned to Motorola.

Since the surface area illuminated by a single frequency is so large compared to terrestrial cellular radiotelephone systems, satellite cellular systems have far lower subscriber capacity and find limited utility in low density and rural markets; metropolitan cellular traffic is far too dense and demands much higher spectral reuse efficiency. With the high cost of building, launching, operating and maintaining a satellite infrastructure, the economic viability of offering radiotelephone service via satellite depends on the ability to integrate terrestrial radio-telephone networks into satellite cellular systems.

This invention takes as its object to overcome these shortcomings and to realize certain advantages presented below.

SUMMARY OF THE INVENTION

If the capacity of satellite-to-terrestrial links could be increased, as by "grounding" a satellite and utilizing its greater inter-satellite bandwidth, high capacity terrestrial networks could be interconnected with the satellite network to provide global cellular inter-working. Metropolitan traffic would be carried by the terrestrial system, while global service would be provided everywhere else by the satellite network.

Thus, there is provided a mechanism for networking satellite and terrestrial networks. It comprises: maintaining subscriber-received power levels of terrestrial network transmissions about one order of magnitude above co-channel satellite transmissions to overcome interference and maintaining subscriber transmissions to terrestrial networks at power levels about one order of magnitude of the below co-channel transmissions to satellite networks to avoid causing interference at the satellite. Such power level maintenance is provided by the network in communication with such subscriber. Moreover, a non-orbiting ("grounded") satellite cooperates as a switching node of both the satellite network and a terrestrial network to relay information between a terrestrial subscriber and the satellite radiotelephone network over a terrestrial network. The terrestrial network and the satellite network may communicate via either the inter-satellite spectrum or the terrestrial-to-satellite spectrum.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

Figure 1:
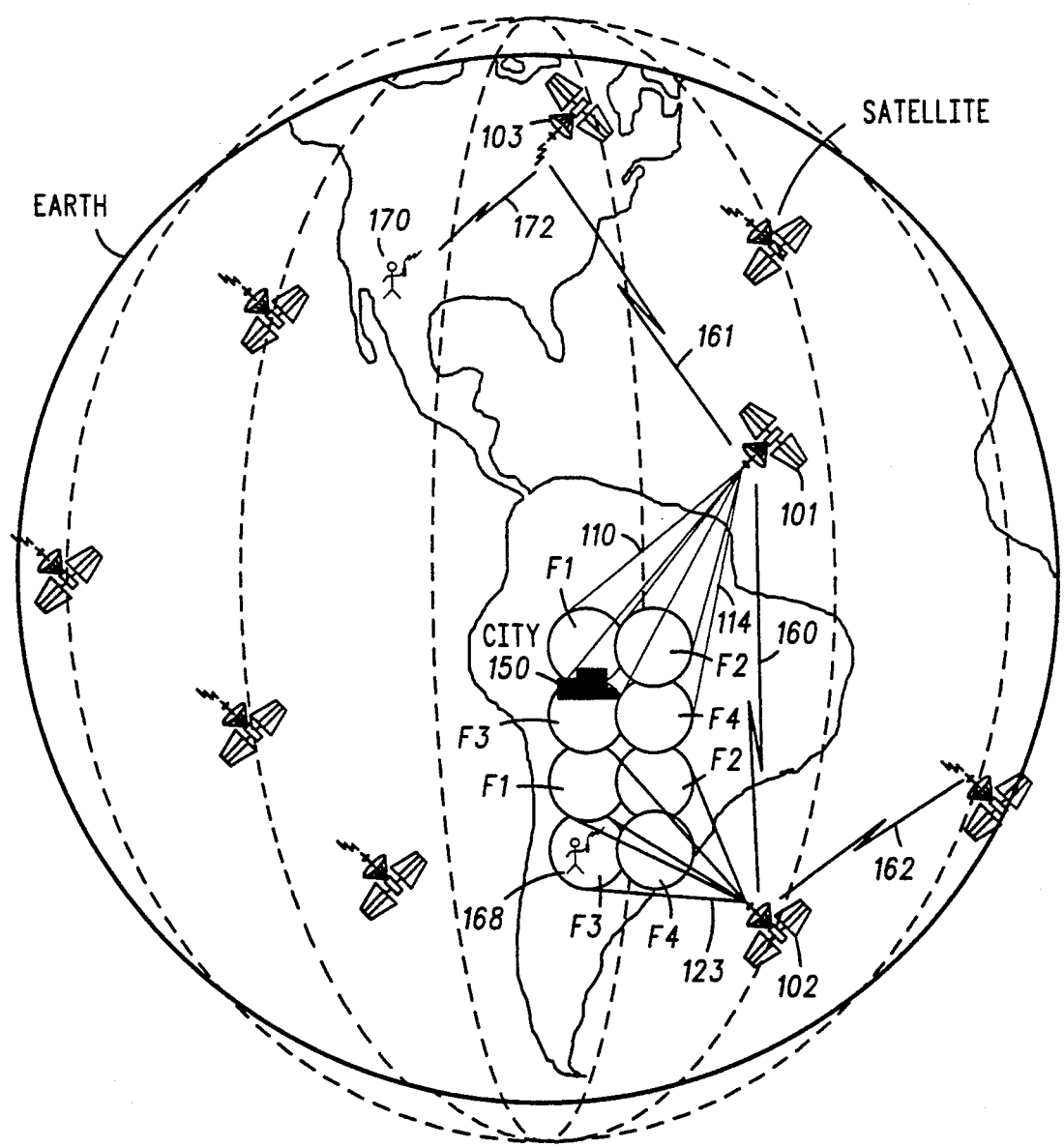
FIG. 1 is a macroscopic diagram illustrating networked satellite and terrestrial cellular radiotelephone networks according to the preferred embodiment of the invention.

FIG. 1 is macroscopic diagram illustrating networked satellite and terrestrial cellular radiotelephone networks according to the preferred embodiment of the invention.

As mentioned above, a major limitation of satellite-based radiotelephone networks is that the surface area illuminated by one satellite antenna constitutes such a large cell that spectral utilization is highly inefficient when compared to terrestrial cell sizes and terrestrial cellular frequency reuse efficiencies. Each satellite cell typically is several hundred miles across due to the limited capability of satellite antenna beam-shaping. This invention increases overall spectral reuse efficiency to that of terrestrial cellular, enhancing the economic feasibility of globally-integrated, cellular radiotelephone service using satellites.

This invention increases spectral efficiency through terrestrial frequency reuse of satellite-to-ground frequencies. In the metropolitan area (150) illustrated in FIG. 1, four frequency sets (F1-F4, a plurality of frequencies in each set) are reused terrestrially throughout the metropolitan area with geographic separation according to the so-called four-cell reuse pattern of Graziano, U.S. Pat. No. 4,128,740, Antenna Array for a Cellular RF Communication System, assigned to Motorola. The problem associated with this terrestrial reuse of the satellite spectrum is to keep the satellite and terrestrial uses of the same frequencies from interfering with one another. According to the invention, the power of transmissions is coordinated and controlled so that those transmissions intended for the terrestrial network do not interfere with those intended for the satellite network.

To avoid interference, terrestrial transmissions are kept about 10 dB higher (at the subscriber) than satellite transmissions, thereby "capturing" the subscriber's receiver. Similarly, the power of subscriber transmissions intended for terrestrial networks are kept sufficiently below those intended for satellite reception, eliminating interference at the satellite receiver. Moreover, subscriber transmissions below the sensitivity threshold of the satellite receiver will not be heard by the satellite, but would likely be heard by a terrestrial receiver of equal sensitivity, due to the differential path loss. Thus, controlling the power of terrestrial transmissions with respect to the power of satellite transmissions and accounting for satellite receiver sensitivity provides the necessary mechanism for non-interfering terrestrial reuse of satellite cellular spectrum. The apparatus required and the system control necessary for such power control is not unlike that implemented in present terrestrial cellular radiotelephone networks and subscriber radiotelephone equipment (see U.S. Pat. No. 4,523,155 to Walczak et al., assigned to Motorola, and U.S. Pat. No. 4,613,990 to Halpern).

Radiotelephone calling into and out of the local terrestrial service area is accomplished by "grounding" satellites to the roof tops of metropolitan structures. The "grounded" satellites use the very same (satellite-to-ground and ground-to-satellite) spectrum as the orbiting satellites (except for those frequencies in the set that might be used to provide supplemental terrestrial capacity).

Figure 2:
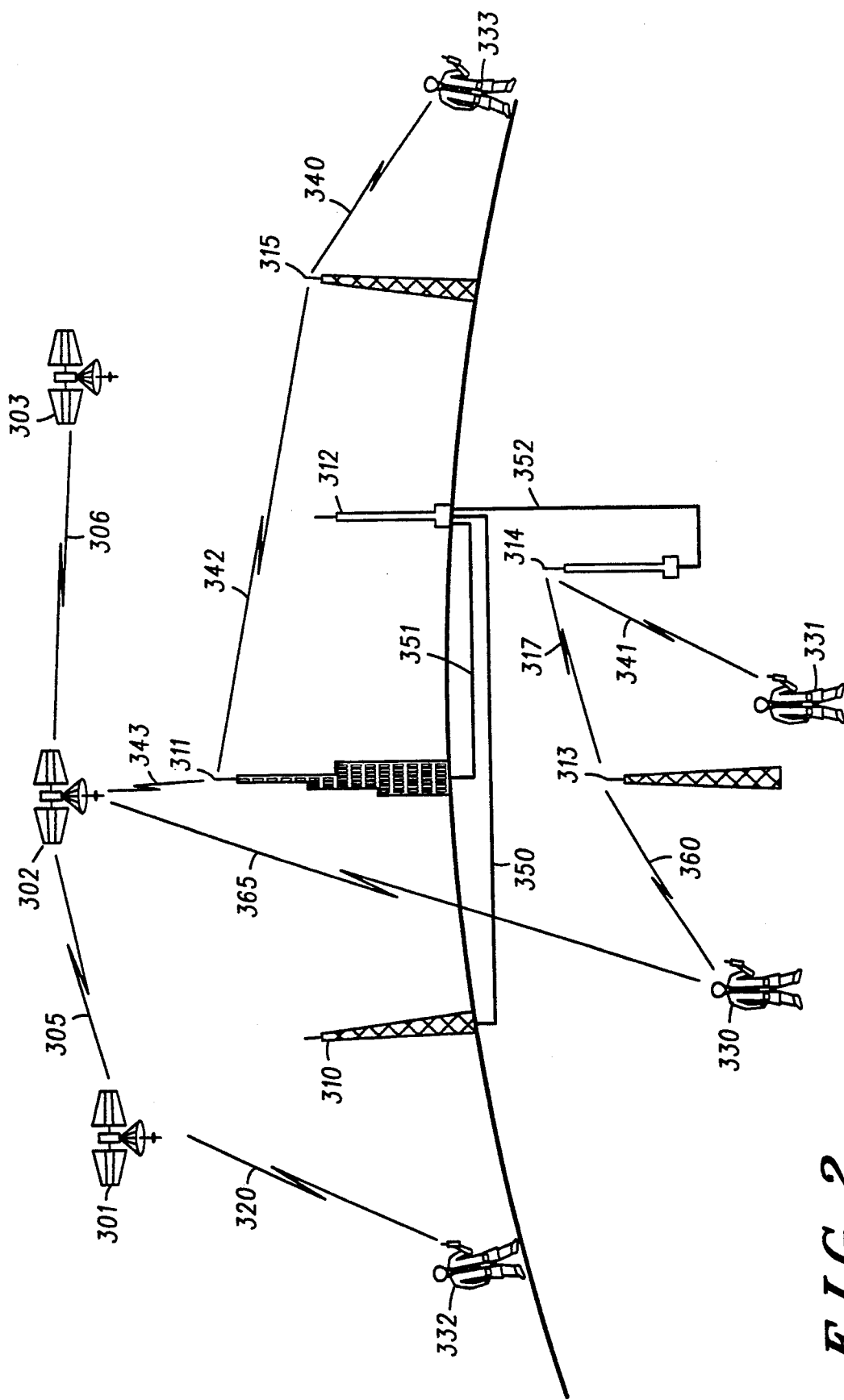
FIG. 2 illustrates subscribers inter-working in a networked satellite and terrestrial cellular radiotelephone network according to the preferred embodiment of the invention.

FIG. 2 illustrates subscribers inter-working in a networked satellite and terrestrial cellular radiotelephone networks according to the preferred embodiment of the invention. It further illustrates a satellite cellular radiotelephone network interconnected with terrestrial cellular radiotelephone networks according to the present invention. The satellite network consists of numerous satellites in low-Earth, polar orbits that sequentially pass overhead (301, 302 and 303). They communicate with subscribers on the ground via a plurality of narrow-band frequencies (F1-F4, 320 and 343) and switch the calls among each other via broadband spectrum (305 and 306) such as microwave, IR or LASER (light). The terrestrial networks illustrated (310, 311, 312, 313, 314 and 315) could represent conventional cellular radiotelephone networks, in-building local-area radio networks, LANs, public switched telephone networks, private branch exchanges or the like. Each might be coupled independently with the satellite network via a "grounded" satellite atop its building. Otherwise, they might be networked together by broadband media such as microwave links (317 and 342) or fiber (350, 351 and 352), having one "grounded" satellite (311) designated to link to the satellite network (302) via one or more of the satellite frequencies (343).

In operation, a subscriber outside the coverage of a terrestrial radiotelephone network (332) initially transmits with sufficient power to capture a satellite receiver (301) at its furthest possible trajectory. An exchange between satellite and subscriber establishes successive power levels anticipated to be used in subsequent transmissions as the satellite moves predictably overhead and then out of range. Radiotelephone calls destined to another service area are switched by the originating satellite (301) via its inter-satellite links (305) to the satellite (302) presently servicing the intended recipient (330). This satellite (302) switches the call via a satellite-to-ground frequency (343) to a grounded satellite (311) atop a metropolitan structure, which, in turn, switches the call across fiber-optic links (351 and 352), point-to-point links (317), and to a terrestrial cellular network (313). The terrestrial network (313) relays the call to the subscriber at a power level some 10 dB above the level of the satellite frequency (343), while the subscriber answers at a power level sufficiently below that that would interfere with signals being returned to the satellite (302). The grounded satellite's location atop tall metropolitan structures lowers the power of satellite-to-ground transmissions from that required "in-the street". Nevertheless, the satellite (302) could transmit directly to the subscriber 330 via one of the satellite frequencies (365) when extra terrestrial capacity is required; both the satellite and the subscriber would transmit at higher power—clearly a less attractive alternative where satellite battery power and hand-portable radiotelephone battery power is concerned.

Thus, there has been provided a mechanism for interconnecting satellite and terrestrial cellular radiotelephone networks. Satellite frequencies are able to be reused terrestrially through power controlled differentials maintained between satellite transmissions and terrestrial transmissions. Spectral reuse efficiency is thereby increased. "Grounded" satellites provide the link to terrestrial networks. Seamless and global radiotelephone coverage is provided by terrestrial radiotelephone networks in metropolitan service areas and by satellite everywhere else, including those metropolitan areas without cellular service.

Although differential power control is the preferred embodiment of the invention, other methods of frequency planning would also be suitable for interconnected networks. Advantageously, the higher bandwidth inter-satellite spectrum can also be reused. The inter-satellite spectrum (305 and 306) could non-interferingly link the grounded satellites with the orbiting ones (and be reused once again between grounded satellites 317 and 342) due to the lateral directivity of inter-satellite links and the perpendicularity of the satellite-to-ground (and ground-to-satellite links). Spectral efficiency would thereby be increased yet again.

With this higher satellite-to-ground bandwidth, the grounded satellites could either be predeterminally and synchronously introduced into the inter-satellite inter-workings, or with predetermined and synchronous forward and backward handoffs, could be synchronously interposed in the satellite call-routing backbone and become an integral part of the satellite switching function.

Yet other frequency plans are available. Conventional terrestrial cellular radiotelephone networks utilize seven frequency sets in a hexagonal reuse pattern of one central cell ringed by six others. If four more sets were utilized to accommodate the situation where a metropolitan area fell at the intersection of four satellite cells, the available cellular spectrum could be divided into eleven sets that could be used dynamically, synchronously and non-interferingly by frequency-agile transceivers aboard the satellites or on the ground; either the terrestrial or the satellite frequency "footprint" would have to change synchronously with each satellite's passage overhead to avoid interference. In other words, time-synchronous frequency reuse would need to be employed. Although less preferred, this would provide no worse than 7/11's frequency reuse, not considering near-ground antenna versus 10 dB path loss efficiencies. Other forms of disjoint frequency sets or satellite reuse patterns non-coincident with terrestrial patterns would provide some incremental spectral efficiencies.

For ease of understanding, the discussion has assumed Frequency Division Multiple Access FDMA channelization, but Time Division Multiple Access TDMA/FDMA implementation is contemplated in order to be compatible with emerging digital cellular standards in the U.S., Europe and Japan. Extension to direct sequence, spread spectrum or Code Division Multiple Access CDMA would be equally feasible.

Thus, there has been provided a mechanism for networking satellite and terrestrial networks. It comprises: maintaining subscriber-received power levels of terrestrial network transmissions about one order of magnitude above co-channel satellite transmissions to overcome interference and maintaining subscriber transmissions to terrestrial networks at power levels about one order of magnitude of the below co-channel transmissions to satellite networks to avoid causing interference at the satellite. Such power level maintenance is provided by the network in communication with such subscriber. Moreover, a non-orbiting ("grounded") satellite cooperates as a switching node of both the satellite network and a terrestrial network to relay information between a terrestrial subscriber and the satellite radio-telephone network over a terrestrial network. The terrestrial network and the satellite network may communicate via either the inter-satellite spectrum or the terrestrial-to-satellite spectrum.

While the preferred embodiment of the invention has been described and shown, it will be appreciated by those skilled in this field that other variations and modifications of this invention may be implemented. These and all other variations and adaptations are expected to fall within the ambit of the appended claims.

What I claim and desire to secure by Letters Patent is:

1. A method of networking a satellite network and a terrestrial network comprising the steps of:
   controlling a terrestrial network transmission within a frequency band with respect to a satellite network transmission also within said frequency band to overcome interference
   and controlling a subscriber transmission to the terrestrial network with respect to the terrestrial network transmission within said frequency band to the satellite network to avoid causing interference at a satellite of the satellite network.

2. A method as claimed in claim 1, wherein the satellite network comprises a non-orbiting satellite.

3. A method as claimed in claim 1, wherein the satellite network and the terrestrial network comprise a non-orbiting satellite cooperating as a switching node of both the satellite network and the terrestrial network.

4. A method as claimed in claim 1, wherein the terrestrial network comprises one or more from the group of networks consisting of: terrestrial wireless networks; terrestrial wireless cellular networks; terrestrial wireless cellular radiotelephone networks; terrestrial wireless in-building networks; terrestrial wireless in-building telephone networks; terrestrial wireless in-building data networks; public switched telephone networks, and private branch exchanges.

5. A method of networking a satellite network and a terrestrial network comprising the steps of:
   maintaining a subscriber-received signal level of a terrestrial network transmission sufficiently above a co-channel satellite transmission to overcome any interference therebetween
   and maintaining a subscriber transmission to the terrestrial network at a signal level sufficiently below a co-channel transmission to the satellite network to overcome any interference at a satellite of the satellite network.

6. A method of networking a satellite network and a terrestrial network comprising:
   maintaining a subscriber-received power level of a terrestrial network transmission to about one order of magnitude of a differential path loss above a co-channel satellite transmission to overcome any interference therebetween
   and maintaining a subscriber transmission to the terrestrial network at a power level about one order of magnitude of a differential path loss below a co-channel transmission to the satellite network to reduce interference at a satellite of the satellite network, wherein such power level maintenance is provided by one of the satellite and terrestrial networks in communication with a subscriber.

7. An apparatus for networking a satellite network and a terrestrial network comprising:
   first means for maintaining a subscriber-received power level of a terrestrial network transmission about one order of magnitude of a differential path loss above a con-channel satellite transmission to reduce any interference therebetween
   second means, coupled to said first maintaining means, for maintaining a subscriber transmission to the terrestrial network at a power level about one order of magnitude of a differential path loss below a co-channel transmission to the satellite network to reduce any interference at a satellite of the satellite network, wherein the power level maintenance is provided by one of the satellite and terrestrial networks in communication with a subscriber.

8. A method of networking a satellite network and a terrestrial network comprising the steps of:
   controlling a terrestrial network transmission with respect to a satellite network transmission to overcome interference
   controlling a subscriber transmission to the terrestrial network with respect to the terrestrial network transmission to the satellite network to avoid causing interference at a satellite of the satellite network
   and dynamically allocating an available communication frequency band among satellite and terrestrial networks in time-synchronism with the satellite movement.

9. A method of networking a satellite network and a terrestrial network comprising the steps of:
   controlling a terrestrial network transmission with respect to a satellite network transmission to overcome interference
   controlling a subscriber transmission to the terrestrial network with respect to the terrestrial network transmission to the satellite network to avoid causing interference at a satellite of the satellite network
   and handing-off a communication path utilized to transmit a communication signal with a non-orbiting satellite in the satellite network from a first satellite to a second satellite in the satellite network during the transmission of said communication signal.

10. A method of networking a satellite network and a terrestrial network comprising the steps of:
    controlling a terrestrial network transmission with respect to a satellite network transmission to overcome interference by maintaining a differential power level of each of the transmissions to the terrestrial network and the satellite network relative to a differential path loss between the transmissions to the terrestrial and satellite networks and controlling a subscriber transmission to the terrestrial network with respect to the terrestrial network transmission to the satellite network to avoid causing interference at a satellite of the satellite network.

11. A method as claimed in claim 10, wherein the differential power level is about one order of magnitude of the differential path loss.

12. A method as claimed in claim 10, wherein the step of controlling further comprises the step of non-interferingly partitioning an available communication spectrum between the terrestrial network and the satellite network.

13. A method as claimed in claim 12, wherein the step of partitioning of the available communication spectrum is accomplished through time division multiplex channelization.

14. A method as claimed in claim 12, wherein the step of partitioning of the available communication spectrum is accomplished through code division multiplex channelization.

15. A method as claimed in claim 12, wherein the step of partitioning of the available communication spectrum is accomplished through frequency division multiplex channelization.

16. A method as claimed in claim 12, wherein the step of partitioning is accomplished through one of: a satellite-related spectrum, reused terrestrially; an inter-satellite spectrum, reused terrestrially; the inter-satellite spectrum, reused between a plurality of terrestrial network nodes; a satellite-to-ground spectrum, reused terrestrially; the satellite-to-ground spectrum, reused non-interferingly terrestrially; and the satellite-to-ground spectrum, reused in time-synchronism with satellite movement.

* * * * *

UNITED STATES PATENT AND TRADEMARK OFFICE
CERTIFICATE OF CORRECTION

PATENT NO. : 5,327,572
DATED : July 5, 1994
INVENTOR(S) : Thomas A. Freeburg

It is certified that error appears in the above-indentified patent and that said Letters Patent is hereby corrected as shown below:

In column 6, line 21: please change "above a con-channel satellite" to —above a co-channel satellite—.

Signed and Sealed this

Fourth Day of October, 1994

Attest:

BRUCE LEHMAN

*Attesting Officer*  *Commissioner of Patents and Trademarks*